US010326600B2

(12) United States Patent
Claes (10) Patent No.: US 10,326,600 B2
(45) Date of Patent: Jun. 18, 2019

(54) ROUTING METHOD OF FORWARDING TASK INSTRUCTIONS BETWEEN COMPUTER SYSTEMS, COMPUTER NETWORK INFRASTRUCTURE AND A COMPUTER PROGRAM PRODUCT

(71) Applicant: Fujitsu Technology Solutions Intellectual Property GmbH, München (DE)

(72) Inventor: Heinz-Josef Claes, Ronneburg (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 276 days.

(21) Appl. No.: 15/315,577

(22) PCT Filed: Jun. 1, 2015

(86) PCT No.: PCT/EP2015/062157
§ 371 (c)(1),
(2) Date: Dec. 1, 2016

(87) PCT Pub. No.: WO2015/185508
PCT Pub. Date: Dec. 10, 2015

(65) Prior Publication Data
US 2017/0222811 A1    Aug. 3, 2017

(30) Foreign Application Priority Data

Jun. 3, 2014    (DE) .................. 10 2014 107 783

(51) Int. Cl.
*H04L 12/717*    (2013.01)
*H04L 9/32*    (2006.01)
(Continued)

(52) U.S. Cl.
CPC .......... *H04L 9/3247* (2013.01); *H04L 9/0643* (2013.01); *H04L 9/14* (2013.01);
(Continued)

(58) Field of Classification Search
CPC ....... H04L 9/3247; H04L 9/0643; H04L 9/14; H04L 9/30; H04L 45/745; H04L 45/42;
(Continued)

(56) References Cited

U.S. PATENT DOCUMENTS 8,977,728 B1 * 3/2015 Martini ............... H04L 61/1511
709/222
9,294,587 B1 * 3/2016 Passaglia .............. H04L 67/145
(Continued)

FOREIGN PATENT DOCUMENTS

EP    1 879 323 A1    1/2008
EP    2 772 856 A1    9/2014
(Continued)

OTHER PUBLICATIONS

Notice of Reasons(s) for Rejection dated Mar. 13, 2018, from corresponding Japanese Patent Application No. 2016-571034, along with an English summary.

*Primary Examiner* — Jason K Gee
*Assistant Examiner* — Abdullah Almamun
(74) *Attorney, Agent, or Firm* — DLA Piper LLP (US)

(57) ABSTRACT

A routing method of forwarding task instructions between secured computer systems in a computer network infrastructure includes calling up routing information stored in a key computer system, generating a task file in the key computer system, wherein the task file comprises at least the routing information and a task description of at least one task for the target computer system; transmitting the task file based upon the routing information along the communication path from the key computer system by the group of the broker computer systems to the target computer system; verifying validity of the task file by the target computer system;
(Continued)

executing at least one task in the target computer system by the task file in the case that verification of validity of the task file was successful.

14 Claims, 4 Drawing Sheets

(51) Int. Cl.
    *H04L 29/06* (2006.01)
    *H04L 12/721* (2013.01)
    *H04L 9/06* (2006.01)
    *H04L 9/14* (2006.01)
    *H04L 9/30* (2006.01)
    *H04L 12/741* (2013.01)
    *H04L 29/08* (2006.01)
(52) U.S. Cl.
    CPC ............... *H04L 9/30* (2013.01); *H04L 45/34* (2013.01); *H04L 45/42* (2013.01); *H04L 45/745* (2013.01); *H04L 63/0428* (2013.01); *H04L 63/101* (2013.01); *H04L 63/123* (2013.01); *H04L 67/06* (2013.01); *H04L 67/42* (2013.01)
(58) Field of Classification Search
    CPC ............... H04L 45/34; H04L 63/101; H04L 63/0428; H04L 63/123
    See application file for complete search history.

(56) References Cited

U.S. PATENT DOCUMENTS

| | | | |
|---|---|---|---|
| 2006/0106675 A1* | 5/2006 | Cohen ................ | G06Q 10/06 705/26.1 |
| 2006/0274726 A1 | 12/2006 | Wikman et al. | |
| 2007/0157307 A1 | 7/2007 | Katoh et al. | |
| 2009/0106834 A1* | 4/2009 | Borzycki ............. | H04L 63/166 726/21 |
| 2010/0031019 A1 | 2/2010 | Manning et al. | |
| 2011/0145910 A1 | 6/2011 | Barnes et al. | |
| 2011/0277022 A1 | 11/2011 | Weizman | |
| 2013/0124757 A1 | 5/2013 | Norrman et al. | |
| 2013/0232559 A1* | 9/2013 | Bello .................. | H04L 45/42 726/4 |
| 2013/0239169 A1 | 9/2013 | Nakhjiri | |
| 2014/0164645 A1* | 6/2014 | Palani ................. | H04L 45/54 709/242 |
| 2014/0245310 A1 | 8/2014 | Claes | |

FOREIGN PATENT DOCUMENTS

| | | |
|---|---|---|
| JP | 2006-352476 | 12/2006 |
| JP | 2008-542892 | 11/2008 |

* cited by examiner

ROUTING METHOD OF FORWARDING TASK INSTRUCTIONS BETWEEN COMPUTER SYSTEMS, COMPUTER NETWORK INFRASTRUCTURE AND A COMPUTER PROGRAM PRODUCT

TECHNICAL FIELD

This disclosure relates to a routing method that forwards task instructions between secured computer systems in a computer network infrastructure, a corresponding computer network infrastructure and a computer program product.

BACKGROUND

Distributed computer networks or so-called computer network infrastructures, describe a plurality of computer systems capable of communicating with one another via data connections. Part of the exchanged data is confidential, and access to the information is denied to non-authorized persons. In particular in computer network infrastructures including server-client-topologies, confidential data such as customer data or user data is exchanged between client and server, wherein access of a third party to the data is to be suppressed.

Conventional security strategies to increase data protection include, on the one hand, provisions (processes to be observed) as well as rules (orders or prohibitions) for third parties, e.g., administrators, which is to ensure merely limited or controlled access to confidential data. In particular, access to confidential data is limited in a computer system by predefined access rights (login rights or user rights) so that only (reliable) persons having respective rights are granted access to confidential data.

On the other hand, technical measures on or in the computer systems are provided to prevent physical and/or logic access to computer systems or restrict access to authorized persons only.

In fact, such approaches to improve data protection are beneficial to data security, but come with the disadvantage that they usually do not necessarily present measures to prevent access to confidential data.

Further, current computer network infrastructures operate via access options or options for addressability of computer systems (e.g., via a network) for data exchange or communication which make computer systems vulnerable toward external attacks. For addressability of services a running program is required on one or multiple network ports of a computer system. The running program poses a potential security gap for external attacks via network.

There is thus a risk that a hacker or an internal employee who obtains access to a computer system may pick up confidential data on the computer system and/or may get access to further computer systems in the computer network infrastructure by the attack, e.g., because he or she pretends to be reliable through a manipulated signature.

On the other hand, there is a need for a computer network infrastructure for communication and processing of information between individual computer systems of required communication structures to be able to instruct a task of a target computer system by another computer system in the computer network infrastructure, for example.

It could therefore be helpful to improve protection against attacks to computer systems within a computer network infrastructure, in particular the non-permitted access to confidential data, by technical measures and nevertheless provide a communication structure that ensures a satisfactory and more secure forwarding of data within the computer network infrastructure.

SUMMARY

I provide a routing method of forwarding task instructions between secured computer systems in a computer network infrastructure, including calling up routing information stored in a key computer system, wherein the routing information defines at least a routing to one or multiple computer systems to be compulsory involved along a communication path between the key computer system, a group of one or multiple broker computer systems and a target computer system within the computer network infrastructure; generating a task file in the key computer system, wherein the task file comprises at least the routing information and a task description of at least one task for the target computer system; transmitting the task file based upon the routing information along the communication path from the key computer system by the group of the broker computer systems to the target computer system; verifying validity of the task file by the target computer system; executing at least one task in the target computer system by the task file in the case that verification of validity of the task file was successful, wherein both the key computer system and the target computer system keep specified network ports used for the method closed such that externally establishing a connection to the key computer system or to the target computer system is not permitted and thus access via a network by the network ports is prevented, and the key computer system and the target computer system may each establish a connection to a broker computer system to store a task file in the broker computer system or fetch it from there.

I also provide computer network infrastructure including a key computer system; a target computer system; and a broker computer system, wherein the key computer system generates a task file from predefined routing information stored in the key computer system for a routing to one or multiple computer systems which are to be compulsory involved and to transmit the task file subsequently by the broker computer system to the target computer system, the target computer system verifies validity of a task file transmitted by the broker computer system to the target computer system and to perform at least one task in the target computer system based upon the task file, and optionally the target computer system and the key computer system each have an access control unit is set up to keep specified network ports used for the method closed such that externally establishing a connection to the key computer system or to the target computer system is not permitted and thus access via a network by the network ports is prevented, but establishing a connection from the key computer system or the target computer system to a broker computer system is permitted to store a task file in the broker computer system or fetch it from there.

I further provide a computer program product set up to be executed on one or multiple computer systems and which, when being executed, performs the routing method of forwarding task instructions between secured computer systems in a computer network infrastructure, including calling up routing information stored in a key computer system, wherein the routing information defines at least a routing to one or multiple computer systems to be compulsory involved along a communication path between the key computer system, a group of one or multiple broker computer systems and a target computer system within the computer network infrastructure; generating a task file in the key computer system, wherein the task file comprises at least the routing information and a task description of at least one task for the target computer system; transmitting the task file based upon the routing information along the communication path from the key computer system by the group of the broker computer systems to the target computer system; verifying validity of the task file by the target computer system; executing at least one task in the target computer system by the task file in the case that verification of validity of the task file was successful, wherein both the key computer system and the target computer system keep specified network ports used for the method closed such that externally establishing a connection to the key computer system or to the target computer system is not permitted and thus access via a network by the network ports is prevented, and the key computer system and the target computer system may each establish a connection to a broker computer system to store a task file in the broker computer system or fetch it from there.

LIST OF REFERENCE NUMERALS key server key computer system
task server broker computer system
admin client processing computer system
target server target computer system
computer computer system
1-28 method steps

DETAILED DESCRIPTION

My routing method comprises:
calling up routing information stored in a key computer system, wherein the routing information defines at least a routing to one or multiple computer systems to be compulsory linked along a communication path between the key computer system, a group of one or multiple broker computer systems and a target computer system within the computer network infrastructure,
generating a task file in the key computer system, wherein the task file comprises at least the routing information as well as a task description of at least one task for the target computer system,
transmitting the task file based upon the routing information along the defined communication path from the key computer system by the group of the broker computer systems to the target computer system,
verifying the validity of the task file by the target computer system,
executing at least one task in the target computer system by the task file when verification of validity of the task file was successful,
wherein both the key computer system and the target computer system keep specified network ports used for the method closed such that externally establishing a connection to the key computer system or to the target computer system is not permitted and thus access via a network by the network ports is prevented, and
the key computer system and the target computer system may each establish a connection to a broker computer system to store a task file in the broker computer system or fetch it from there.

In such a routing method, the required entities or communication hubs (computer systems) need to be specified on a communication path (of possibly multiple possible communications paths) between a key computer system, a group of one or multiple broker computer systems and a target computer system for forwarding and processing a task command. This means that the transmission of a task command to a target computer system adheres to a route on which certain entities or communication hubs are pre-defined by the key computer system. This way, within the key computer system a path (routing) is pre-defined along required entities with actions to be possibly performed. Communication between distributed computer systems in a computer network infrastructure for forwarding task commands to a target computer system is thus restricted to pre-defined involved computer systems along a communication path.

It is possible to differentiate between a so-called "static" routing and a so-called "dynamic" routing in my method.

In a static routing, the entire communication path is specified up to a target computer system in the key computer system. Static routing can be used for reasons of security so that manipulations of the path do not form attacking options for potential crackers.

In dynamic routing, merely compulsory linked computer systems along a possible communication path are predefined by the key computer system to accept a task file in a target computer system. A specific communication path, possibly including a specific target computer system, is determined only "on route," possibly sectionally, by the involved computer systems. This provides the advantage that a flexible response may be possible to a routing, nevertheless while maintaining the security required against manipulations. Then, merely routing information is to be defined in the key computer system, which can be used for multiple routings to various target computer systems without the necessity of predefining a routing for each target computer system per se. Further, dynamic routing permits a certain freedom for involved computer systems to specify a target computer system per se.

It is also possible to define various alternative communication paths to a target computer system through the key computer system, wherein a selection of one or multiple of the alternative communication paths is effected by computer systems involved in the process. Furthermore, it is possible that computer systems involved in the process select multiple target computer systems of a group of target computer systems predefined by the key computer systems. Communication paths to the target computer systems can be different and be defined by the above-described procedure (static, dynamic, alternative).

A possible manipulative deviation from computer systems involved in the communication path and predefined by the key computer system and thus a re-routing of security-relevant information and data to possibly non-authorized computer systems of hackers is significantly complicated compared to conventional solutions. This way, security within a computer network infrastructure can be increased by my method.

In the method, the key computer system and the target computer system further act as encapsulated systems. Access to the computer systems to establish a connection via a network is not possible or only hardly possible under certain operating conditions (advantageously permanently while performing the method described herein or above method steps, respectively).

The term "specified network ports" means that all or only selected security-relevant network ports, e.g., the network ports used for my method, are permanently or temporarily closed.

This provides the advantage that no programs are set-up, booted or even required both on the key computer system and the target computer system which listen to the respective network ports for the purpose of addressability or establishing a connection, respectively, and which do pose a potential security gap (e.g., by a buffer overflow). Thus, the term "closed network ports" means in this context that the ports are not "listening ports," i.e., establishing a connection externally is not permitted. In this case, a third party is not able to authenticate or log-in at the key computer system or at the target computer system externally via network, e.g., in Unix-based systems via a secure shell (SSH) daemon, or to perform special actions on the key computer system and target computer system, respectively.

Nevertheless, local access to the key computer system may be provided for a first user group (e.g., security personnel). Local access to the target computer system may be provided for a second user group. However, advantageously, local access to the respective alternative computer system by the respectively other user group is prevented. Advantageously, local access to a respective computer system for a respective user group is temporarily released only by the method described herein as a part of a process.

In contrast to key and target computer systems, however, the method permits external access to a broker computer system among a group of broker computer systems. Each one of the group of broker computer systems is accessible via network as an "open" system with at least one addressable open ("listening") network port. That means that programs are running on a broker computer system and/or applications are prepared so that the key computer system or the target computer system can access the broker computer system and establish a connection to the broker computer system to store a task file according to the proposed method (via an established connection) in a broker computer system or fetch it from there. In terms of security aspects, such "open" broker computer system is similar to a traditional, specifically secured computer system.

As a result, each one of the broker computer systems serves as a (secured, but addressable) broker for communication between the key computer system and the target computer system, which, however, are encapsulated per se. This enables a predefined routing method to forward information and forward task instructions by the group of broker computer systems despite encapsulated key and target computer systems.

A task file may be signed and, possibly, encrypted (partially) by a public key of the target computer system in the key computer system. The key computer system per se may add information to the task file that enable confidential information about the source, target or a respective routing.

In this context, task files are prepared to perform certain processes (tasks) in a target computer system. Such processes may be, e.g.:
storing and/or processing of transmitted data,
re-starting a program in the target computer system,
the instruction to a physical access to the target computer system, restoring back-up data, or
SSH access to the target computer system.

Respective combinations of such actions and instructions are naturally possible. If applicable, task files may be supplemented with specific information in the key computer system or in other computer systems. This enables both event-controlling of the target computer system or a forwarding of information between the key computer system and the target computer system and flexibly adding information during the process to be controlled. As an alternative or in addition, it is possible that task files contain one or multiple programs, scripts or the like, which can be executed on the target computer system or on further computer systems involved in the process.

A task file is essentially different from a pure command instruction of the key computer system to the target computer system since a command instruction requires a continuously running, externally open and thus vulnerable program on the side of the target computer system for evaluating the command instruction. However, such a program can be omitted, as described above, in my method due to a lack of access to the target computer system via network.

To transmit a task file to the target computer system, a process may be triggered that calls up the selected task file in the respective broker computer system and automatically transmits the file from the broker computer system to the target computer system. Advantageously, automatic transmission of the task file from the broker computer system to the target computer system is designed such that a third party does not have external influence on the transmission and thus a risk of manipulation of the target computer system via the task file is excluded. Validity of the task file can be verified in the target computer system and a respective task may be performed.

A task file may be forwarded in the communication path from a first broker computer system to at least a second broker computer system among the group of broker computer systems. Furthermore, even a group of multiple target computer systems may be designed to be addressed by the method.

The general advantage of the method described herein lies with the fact that a frame is specified by setting and possibly signing information about a required path or entities required on the path (routing) within the key computer system, what may and has to be performed when by which computer system. Non-authorized computer systems and/or users of respective computer systems that are not inside the specified communication path are excluded. Furthermore, the computer systems in which data is processed are secured against external attacks by (permanently) closed network ports. This ensures an increased security of confidential data in the computer network infrastructure.

Advantageously, the method comprises the following steps:
transmitting a request file from one of a group of one or multiple processing computer systems to one of the group of the broker computer systems, wherein the request file contains specified information for performing a task on the target computer system, transmitting the request file from the broker computer system to the key computer system, wherein the key computer system establishes a connection to the broker computer system to fetch the request file from the broker computer system, and compiling the task description by the key computer system, wherein based upon the specified information of the request file a specified basic functionality of a task is selected by the key computer system and, possibly, performance parameters to perform the task in the target computer system are set by the key computer system.

As a result, a specified task can be initiated and instructed on the target computer system by a processing computer system of the type described. Selection of a basic functionality of a respective task in the target computer system is effected in the key computer system by specified information of the request file. A respective basic functionality may be a process, instruction and/or action of the above-described type, for example.

For example, a basic functionality can be stored in the key computer system through a prepared "form." The form may be specified by a user of a user group that has local access to the key computer system. If appropriate, the forms can (and are to) be signed by private keys, which however are not stored in the key computer system. This way, possible basic functionalities of possible target computer systems are determined by predefined forms in the key computer system. Non-predefined forms cannot be established since private keys to sign forms are not available in the key computer systems. This way, manipulation by allocation of manipulated forms and thus manipulated basic functionalities is strongly complicated.

As a result, a user of a processing computer system can only select from predefined basic functionalities for a task in the target computer system and possibly determine parameters to perform the respective task. As a result, instructions within the computer network infrastructure are limited to selection of functionalities provided by the key computer system. The task description can be generated from the predefined basic functionalities for a task and the respectively determined parameters to perform the task. The description thus contains information required to determine which task be performed under which conditions on the target computer system. The task description may also contain an identification or ID, respectively, that can be assigned to one or multiple scripts on the target computer system for performing the task.

Preferably, the specified information of the request file comprises such information of the requesting processing computer system as instruction giver and/or such information of the target computer system as instruction taker and/or a digital signature of the requesting processing computer system and/or further, e.g., confidential, data or content.

This means that a request file may specify source and target of a communication by the specified information. Furthermore, a qualified signature (e.g., in Unix based systems via GPG) can be generated to verify the source as a reliable source. This prevents manipulation of the request file and finally of the task file generated in the key computer system through a non-authorized source.

For example, a signature can be generated in that specified data is hashed (e.g., via MD5 or SHA), which is subsequently encrypted with a private key of the signatory (e.g., within the requesting processing computer system or the key computer system). The encrypted signature is incorporated in one digitally signed file (request file or task file) together with a security certificate with the respective data. On the side of the recipient (e.g., locally in the target computer system), in turn, the determined data is hashed and compared to the hash value of the digital signature, which had previously been decrypted by a public key of the signatory. If the two hash values are equal, the signature is valid and specifies a reliable source. Manipulation of the system requires calculation or determination of the asymmetric keys (private key and public key). Another general advantage of the described method thus lies with the fact that signatures can be effected by use of a private key only locally (and not via network) and in a cascaded decentralized fashion, if appropriate (both in the requesting processing computer system and the key computer system).

Furthermore, confidential content may be transmitted in the task file by the supplemented information, e.g., specified information about a target user of the target computer system. The task file may incorporate all information as a .tar file, for example.

Advantageously, each one among the group of processing computer systems at least temporarily or permanently keeps specified network ports used for the method closed such that externally establishing a connection to the respective processing computer system is not permitted and thus access via network by the network ports is prevented, wherein however each one among the group of processing computer systems can establish a connection to a broker computer system to store a task file or a request file in the broker computer system or to fetch such file from there. Thus, the group of processing computer systems also behaves like encapsulated systems, as described above. Local access to a respective processing computer system may be provided to a third user group, which is different from the first and second user groups (see above for key and target computer systems), wherein however local access of a user group to the respectively other computer system is prevented or strongly complicated.

Thus, even external access to the group of processing computer systems via network is not possible or strongly complicated. A running program (for a service) at a network port for external addressability is not provided and required in any of the processing computer systems. This increases security of the computer network infrastructure. Nevertheless, the processing computer systems are involved in the communication process of forwarding task instructions and may initiate request files (as described above) to instruct a specified task in a target computer system according to the above described method and trigger event control of an action on a target computer system.

Advantageously, in the method described above, the routing information define at least one of a group of processing computer systems within the computer network infrastructure as a computer system to be compulsory involved, wherein the method additionally comprises the following steps:

transmitting the task file from at least one of the group of the broker computer systems to at least one of the group of processing computer systems, performing at least one action in the processing computer system, and transmitting the task file from the processing computer system back to the broker computer system.

By the measures mentioned above, the task file is necessarily transmitted to a (further) processing computer system on its way en route the communication path. This triggers (possibly automated) performing specified actions in the processing computer system. For example, the action may include verification of the task file, insertion of further data into the task file and/or further signing of the task file with at least one private key and/or encrypting the task file with a public key of the target computer system (or even another processing computer system in the routing).

Additional above mentioned actions in involved processing computer systems can be specified by the key computer system. Alternatively or additionally, merely routing to one processing computer system may be specified by the key computer system, wherein a processing computer system may decide whether it performs an action to the task file or not. It is also possible to reduce an action merely to the point that the task file is confirmed in the processing computer system before being transmitted to another computer system by the method. The decisive factor with all actions according to the described method is that the actions are executed or performed locally in an involved computer system (key computer system or processing computer system) so that security-relevant passphrases or keys are present or used only locally (i.e., de-centrally) on the computer systems and need not be exchanged within the computer network infrastructure. This task also increases security against attacks of an intruder both internally and externally. In addition to the above measures, (spatial) security zones may be formed, the zones preventing physical access (possibly secured by high-security racks) and thus manipulation of computer systems of other internals.

By an above described, multi-step as well as chained process of processing and/or signing the task file by multiple involved computer systems within the computer network infrastructure, multiple entities are required to generate a valid and reliable task instruction for a target computer system. Thus, the task file has to run through multiple entities to get to the target computer system. The frame as to whether which computer system needs to do what and when by the task file is pre-set by the routing information in the key computer system.

Processing the task file in a cumulative manner (e.g., multiple signing) by multiple processing computer systems besides the key computer system and with decentralized topology of a computer network infrastructure set-up this way results in increased security against attacks. This enforces a multi-eyes system and realizes traceability as to whether which computer system did what and when. The only option for a cracker to manipulate the task file on its way from the key computer system to the target computer system would be intruding all computer systems involved to manipulate the required signatures there, for example, by phishing a passphrase of an operator. However, since the computer network infrastructure does not provide central attacking options due to the fact that all computer systems are decentralized and each of the computer systems assumes one sub-task, manipulation of the entire method is hardly possible and would be very elaborate, respectively.

A major option of manipulation of the task file transmitted via the method would only result from intruding the target computer system (the computer system that is to perform a task according to the task file), possibly in conjunction with obtaining administration rights on the target computer system. Then, verification of signatures (including the signature of a specified basic functionality of the task file by the key computer system) could be manipulated. However, this is very elaborate due to a chained signing of the task files. Nevertheless, the target computer system (as described above) keeps all network ports decisive to the described purposes closed so that externally addressing services of the target computer system is not possible via network. As a result, even manipulation of a task instructed by a task file transmitted properly according to the method in the target computer system is possible subject to extraordinary efforts only.

Just as well, a physical access of manipulation protection may be provided by a secured high-security rack, in which the target computer system is located, as described above already for the key computer systems and processing computer systems, respectively.

The method may be performed recursively in multiple cycles between the group of broker computer systems and the group of processing computer systems, resulting in the above mentioned advantages of chained multiple processing (e.g., signing) of the task file. The task file is designed as a recursively set-up archive file. That means that the task file as an archive file in turn contains an inner archive file as well as a signature of a processing computer system or of the key computer system from a preceding cycle. In turn, the inner archive file may comprise another signature or the like. As a result, the archive file is present as a nested archive file.

In one constellation, in a first step, newly added data as well as the entire previously received task data package is packed into a new inner archive after a processing of the task file. In a second step, in turn, the new inner archive is packed to a new task file as an archive together with a signature generated by the processing computer system in the current cycle. Thus, two additionally nested archives result per recursion cycle.

In that constellation, the task file may have the following exemplary structure:
 id.taskid.tar
 -->task.rar
 -->task.tar.asc.

"id.taskid.tar" describes the actual task file as a .tar archive. The inner archive "task.rar" is inside the archive and includes the recursively stored data of preceding cycles. Besides, a signature ""task.tar.asc" is set-up, by which the inner archive "task.tar" has been signed by a processing computer system or a key computer system in a preceding cycle.

In that constellation, the inner archive file "task.tar" contains one or multiple, possibly nested, archived work files to be processed. In the processing of the task file according to the method in a respective processing computer system, the work files have to be entirely unpacked for evaluation of the respective step however. Thus, due to the performance of the task file as a nested archive file, there is a problem that the work files are present multiple times in a recursive unpacking of the task file—depending on the number of preceding transport steps performed according to the method. If, for example, unpacking the task file "id.taskid.tar" is required in a first step and unpacking the inner archive file "task.tar" is required in a second step of completely unpacking the work files, the work files are stored twice. After n cycles of the method, the work files would be present 2×n times already in a complete unpacking of the files. This is no problem for relatively small files. In larger work files, e.g., import files, which may possibly comprise several gigabytes or terabytes, a great storage space is required, which may lead to a disadvantageous delay in the process.

In an advantageous alternative constellation, due to the above mentioned problem, the task file is set-up as a recursively designed archive file in a modified form. In the second constellation, the task file may have the following the following structure:
 id.taskid.tar
 -->pullupFiles -->task.tar
-->task.tar.asc.

The one or multiple work files are contained in the inner archive file "task.tar" in the task file "id.taskid.tar" in a separated manner. The work files are embedded in a specific directory "pullupFiles" separately to the inner archive file "task.tar" in the task file "id.taskid.tar." In addition, in the second constellation, the task file "id.taskid.tar" includes a signature "task.tar.asc" of a first processing computer system or of the key computer system from a preceding cycle in analogy to the first constellation.

In that constellation, the inner archive file "task.tar" includes recursively nested signature data of previous cycles that have been signed by the signature "task.tar.asc" of the directly preceding cycle. In contrast to the first constellation, the data modified in the current cycle is directly added to the "pullupFiles" directory and not involved in the recursive structure of "task.tar." This provides the advantage that merely the task file "id.taskid.tar" needs to be unpacked once for a further processing of the work files within the task file "id.taskid.tar" in a further cycle so that the work files are only stored once.

Nevertheless, the work files and respective changes to the files are linked to the recursive structure "task.tar" so that the advantages of chained, multiple processing (e.g., signing) of the task file result as well. However, the second constellation provides the advantage that the data volume for performing the recursive method can be significantly reduced compared to the first constellation. This way, performance of the method is improved as well.

All measures of packing and unpacking the task files can be performed by a file archiver.

Advantageously, in a method according to the second constellation, the following steps are performed:
unpacking the task file set-up as an archive file,
processing the one or multiple unpacked work files,
packing at least the inner archive file as well as the signature of the preceding cycle in a second inner archive file,
generating a new signature of the processing computer system involved in this cycle, and
packing the second inner archive file, the processed one or multiple work files and the generated new signature into a new task file set-up as an archive file.

Advantageously, in the method of the described type, multiple security entities are set-up within the processing computer system. At least accepting the task file by the broker computer system, performing at least one action based upon the task file, as well as transmitting the task file from the processing computer system back to the broker computer system are performed by processes separated from one another by different security entities. Advantageously, a security entity of a process is not capable of establishing a connection or communication to a security entity of another process so that access to the security entity of the other process is prevented, wherein, however, a subsequent process is triggered by an event mechanism so that a security entity of the subsequent process is capable of further processing the task file or data of the task file.

The term "security entity" may, on the one hand, include various users who have local access to the processing computer system in the context of restricted user rights to execute the respective process. Advantageously, in particular, the user rights are restricted to the respective process, or for performing a process access to a certain storage area, selected directories and the like, is restricted. On the other hand, the term "security entities" also includes programs or daemons that are set-up to perform the individual processes and stored in certain (logically separated) storage areas. Such programs advantageously only have access to restricted storage areas.

Inter-process-communication between the individual programs and/or users is restricted such that communication is not possible between the individual processes. In particular, a task file or data of the task file may not directly be transmitted from one security entity of a preceding process to a subsequent program or a respective user or be called up as a function of a subsequent process by a preceding process. Rather, a security entity of a preceding process may not establish a connection to a security entity of a subsequent entity so that access to the security entity of the subsequent process is prevented. This complicates manipulations of subsequent security entities by manipulated processes or manipulated task files or extension of an attack locally in the respective processing computer system as far as possible. Thus, processing the task file within the processing computer system is similar to the exchange of the task file between the individual computer systems of the computer network infrastructure.

The internal transfer of the task file or of data from the task file or triggering a respective subsequent process is realized by one or multiple file systems. Advantageously, the transfer or triggering of the next process can be effected via an event mechanism (e.g., "inotify" or "inotify2" in Linux) or optionally by polling or by a combination of such mechanisms. Advantageously, subsequent processes or security entities of subsequent processes are called up, started and activated in an event-driven manner via the kernel of the processing computer system (e.g., "inotify") only when the preceding processes is finished.

The flow of communication on a processing computer system advantageously is effected based upon the task file. A task file runs through different (logically separated) security stage or storage areas in the processing computer system that are assigned to users having minimized rights (e.g., restricted shell) or to different programs or daemons. At least the following general processes are provided for processing the task:

receiving the data via network or fetching the data from the broker computer system according to the method. The user set-up for this process should, if possible, not have Shell rights to complicate logging into the processing computer system as the user and thus external manipulations as much as possible;

unpacking and verifying the data of the task file. A verification optionally includes validation of the signatures as well as optionally the reliability of previous inputs. Optionally, further verifications and measures for data processing may be effected. It is also possible to verify the size of the task file. For example, first, a possibly signed information about the maximum permitted file size and subsequently the task file per se may be transmitted (e.g., via SSH). After that, verification is made as to whether the task file fulfils the required maximum size. Possibly, the method is aborted in that case that the permitted file size is exceeded;

initiating and performing an action on the processing computer system according to the method. The action may possibly have to be performed with administration rights. It may be the performing of a script/program for, e.g., an administrative action or, e.g., the supplementation of the data of the task file and/or a signing by an administrator, operator or other person. Another example is the verification of the identity of a person, e.g., via biometric features;

determining the next processing or target computer system for the routing of the (supplemented) task file by the method, packing as well as signing the task file;

transport to the next processing or target computer system.

The order and particularly the division of the above mentioned aspects in the super-ordinate processes can be optionally changed.

Preferably, the transmission of the task file from one of the group of the broker computer systems to the target computer system or from one of the group of processing computer systems comprises the following steps:

sending a specified sequence of package data from the broker computer system to the target computer system or the processing computer system, wherein the specified network ports of the target computer system or of the processing computer system are closed and wherein the sequence addresses one or multiple network ports of the target computer system or the processing computer system in a specified order, verifying the sent sequence for conformance with a predefined sequence in the target computer system or in the processing computer system, and causing the transmission of the task file by the target computer system or the processing computer system if the verification of the sent sequence is positive, wherein the target computer system or the processing computer system, respectively, establishes a connection to the broker computer system and fetches the task file.

A transmission of a request file of a processing computer system from a broker computer system to the key computer system based upon the above described measures can be effected according to the method steps indicated at this point.

The method steps here provide the advantage that generally the network ports (decisive for the method) of the target computer system or of an involved processing computer system (in the sense described above) are closed and block externally establishing a connection to the target computer system and significantly complicate manipulative access, respectively. Causing the transmission of the task file by the target computer system or a processing computer system may be an automated process for transmitting the respective task file to the target computer system or to a processing computer system (e.g., via the Unix based command "secure copy," scp). According to the process, the target computer system or a processing computer system per se establishes a connection to the broker computer system and fetches the task file from there. This process can be started after sending a specified sequence of package data to the target computer system, if the sequence matches a predefined sequence. The IP address of the sequence sending computer system can be statically set in the target computer system or be taken dynamically from the source IP addresses of possible sequence-sending computer systems known to the kernel of the target computer system.

Such a method is known as "port-knocking." The previously mentioned steps can be performed by a so-called knock daemon, i.e., a program that enables port-knocking. The knock daemon listens at the network ports of the target computer system, verifies the sequence of package data sent to the target computer system and causes, if appropriate, a controlled transmission of the respective task file (e.g., by starting a script/program) from a broker computer system to the target computer system or a respective processing computer system without the target computer system or the respective processing computer system needing to hold an open port available to that end.

As an alternative or in addition to the described port-knocking, it is also possible that the target computer system or an involved processing computer system polls per se at regular intervals at the broker computer system (polling) as to whether one or multiple task files to be exchanged are present. If this is true, a respective transmission of the task file from the broker computer system to the target computer system or to the respective processing computer system can be initiated. It is also possible that the target computer system or the respective processing computer system performs polling when a certain time period is exceeded in which port-knocking has not been effected. This way, port-knocking problems can be detected and functionality is maintained.

The described measures enable communication between secured computer systems within the computer network infrastructure via the group of broker computer systems, wherein at the same time, by the key computer system, a fixed frame of the communication structure for forwarding task instructions by respective task files is set by the routing information. This way, the key computer system, the group of broker computer systems as well as the group of processing computer systems form some sort of "secure communication middleware" according to the method described herein, between a processing computer system initiating the task and the target computer system on which a respective task is to be performed.

Preferably, in the method of the type described herein, the communication path has a plurality of sub-paths, wherein the task file is transmitted by a broker computer system along the plurality of sub-paths to a plurality of subsequent computer systems in the communication path.

The subsequent computer systems in the communication path may be broker, processing or target computer systems. This way, the task file can be further distributed from a single computer system to a plurality of receiving computer systems, according to a communication structure 1:n. The indicated measures are also possible to be interactive so that a cascaded further distribution is effected, that means from one of the plurality of receivers to a plurality of further computer systems.

In the further distribution mentioned, asynchronous further distribution may be effected. If a computer system cannot be reached, the task file is independently transmitted to the other computer systems. Just as well, besides the different receiving computer systems, different transmission methods may be implemented (according to Unix-based instructions, scp, rsync, transmission protocols specially established to that end or the like).

Preferably, in the method, the task file is provided with an identification unique within the computer network infrastructure in at least one of the participating computer system along the communication path, or an already existing identification of the task file is supplemented.

A respective identification of the task file allows traceability even across several entities of the communication path. Supplementing the identification may be providing it with a unique extension, for example. An original identification of a first entity is supplemented advantageously such that the original information is maintained to be differentiable from the extension, and thus the identification can be traced back to its origin even across several supplementation stages.

Advantageously, in the method of the type described herein, the history of the task file along the communication path is monitored by a monitoring method and/or a storage period of the task file on a participating computer system along the communication path is monitored and/or all method steps are logged by monitoring.

Based upon the identification of the task file in conjunction with the stored routing information determination can be made as to whether the communication path is observed and which computer systems can and might be (successfully) reached in the routing. A storage period of the task file on a specified computer system may be defined by the key computer system, for example, during generation of the task file. It may further be defined that after elapse of the retention period, the task file cannot or must not be transmitted further or eventually becomes useless. If required, alert messages may be generated or other measures can be taken, the measures being logged by the routing process.

Advantageously, in the method, monitoring is at least partially effected by a statically-running program on one or more of the computer systems involved along the communication path. The option of a static configuration of the monitoring by a statically-running program on one or more computer systems to be monitored prevents that parameters for configuration need not be exchanged within the computer network infrastructure and potential security lacks are not caused by running programs (by buffer overflow, for example).

Advantageously, a dedicated monitoring computer system establishes an encrypted connection to the monitoring program. Advantageously, the monitoring computer system is set up to be separated from the further involved computer systems. Advantageously, monitoring can be set up via a monitoring network per se. Thus, monitoring is independent from the further communication structure of the computer network infrastructure. Advantageously, the monitoring computer systems keeps all network ports in direction to the computer systems to be monitored closed. Establishing an encrypted connection by a computer system encapsulated such that increases security as well. It is advantageous to set up an encrypted connection to the computer systems to be monitored, via SSH or VPN, for example, as well as not to keep open further ports for connections at the computer systems to be monitored.

In addition, or as an alternative to a dedicated monitoring computer system, participating computer systems may as well assume monitoring (sub-)tasks.

I also provide a computer network infrastructure comprising:
 a key computer system,
 a target computer system, and
 a broker computer system.

The key computer system is adapted to generate a task file from predefined routing information stored in the key computer system for routing to one or multiple computer systems to be compulsory involved and subsequently transmit the task file to the target computer systems by the broker computer system.

The target computer system is set up to verify a task file transmitted to the target computer system for validity by the broker computer system and, if necessary, to perform at least one task in the target computer systems by the task file.

The target computer system and the key computer system each comprise one access control unit set up to keep predefined network ports used for this method closed such that externally establishing a connection to the key computer system or to the target computer system is not permitted, and thus access over a network by the network ports is prevented, but establishing a connection from the key computer system and the target computer system, respectively, to a broker computer system is permitted to store a task file in the broker computer system or fetch it from there.

Preferably, the computer network infrastructure also comprises a processing computer system set up to send a request file to perform a task on the target computer system by the broker computer system to the key computer system.

In this context, the key computer system is advantageously set up to store specified information of the request file to perform a task in the target computer system in the task file. The processing computer system comprises an access control unit set up to keep specified network ports used for this method open such that externally establishing a connection to the processing computer system is not permitted and thus access via a network by the network ports is prevented, but establishing a connection from the processing computer system to the broker computer system is permitted to store a task file or a request file in the broker computer system or to fetch it from there.

A computer network infrastructure of the described type advantageously permits performing a method of the above-described type. Just as well, the advantages stated in conjunction with the above-described method take effect by a computer network infrastructure of this type in an analogous manner. All advantageous measures described in conjunction with the above method are applied in respective structural measures of the computer network infrastructure and vice versa.

We further provide a computer program product set up to be executed on one or more computer systems and which, upon execution, executes a method of the type described above.

Further advantageous configurations are disclosed in the description of the figures given herein below. In the following, this disclosure is described in greater detail based upon the drawings.

Figure 1A:
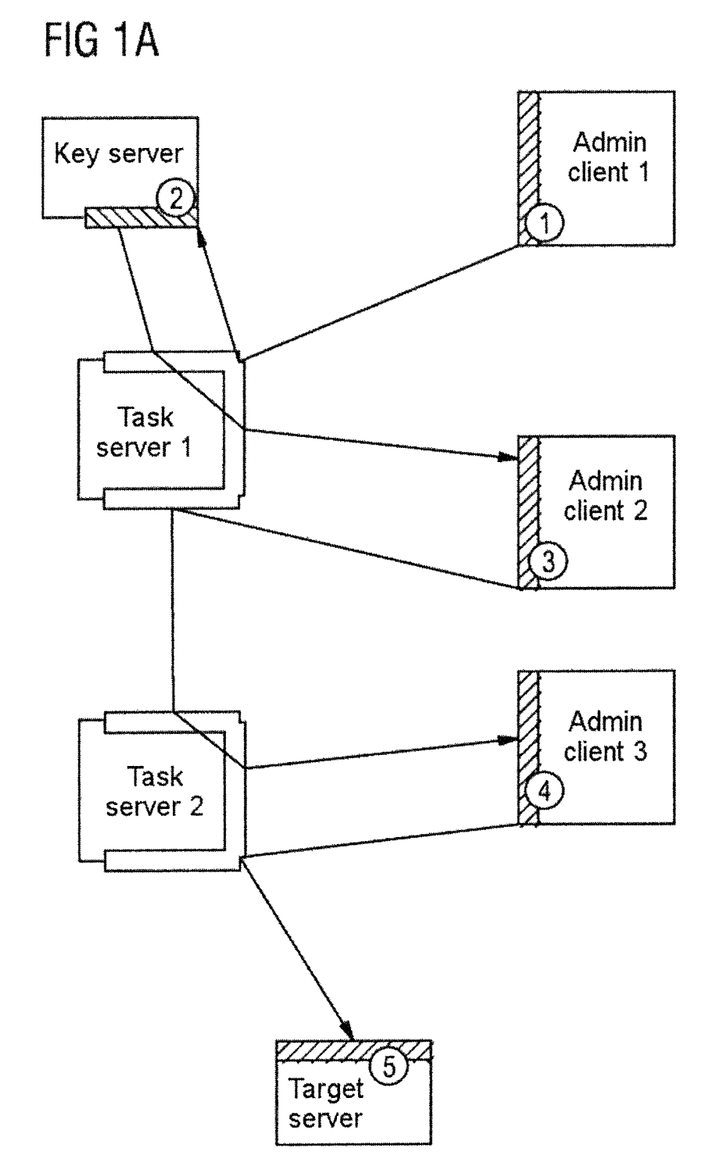
FIG. 1A shows a schematic illustration of a computer network infrastructure with basic method steps for communication.

FIG. 1A shows a schematic illustration of computer network infrastructure comprising a plurality of computer systems and set up to forward information of task instructions between secured computer systems.

Specifically, the computer network infrastructure comprises a key computer system set up as a key server, a group of broker computer systems comprising a task server 1 as well as a task server 2, as well as a group of processing computer systems comprising an admin client 1, an admin client 2 as well as an admin client 3. The computer network infrastructure further comprises a target computer system, referred to as target server in FIG. 1A.

The two broker computer systems, the task server 1 as well as the task server 2 are basically different from the other computer systems involved. In contrast to the other computer systems task server 1 as well as task server 2 are computer systems with open network ports such that both broker computer systems, task server 1 and task server 2 can be addressed externally via the network by the further computer systems. Advantageously, task server 1 and task server 2 are secured systems. Only predefined VPN or SSH connections are permitted to these systems, for example.

In contrast, the key server, admin clients 1 to 3 as well as the target server are secured computer systems keeping all predefined network ports closed. In this case, no running programs or services are set up at the network ports of these computer systems such that external addressability via the network by open network ports is not possible. This way, the computer systems with network ports closed are encapsulated systems within the computer network infrastructure. Compared to the broker computer system, this is illustrated by crosshatched input/output stages at the key server, the admin clients 1 to 3 as well as the target servers.

Nevertheless, communication between the involved computer systems is possible. The key server, admin clients 1 to 3, as well as the target server are each capable of accessing task server 1 or task server 2 via network, because task servers 1 and 2 comprise (as described above) open network ports, possibly with running programs, for external addressability. Thus, data packages, files or requests may be addressed to the task servers 1 and 2, transmitted thereto and stored thereto for further communication with other involved computer systems.

For a communication from one of task servers 1 or 2 to the key server, the admin clients 1 to 3 or the target server, the computer network infrastructure uses a port knocking process. This is required because key server as well as admin clients 1 to 3 and target server (as described above) keep all network ports closed and no running services on this computer system can be externally addressed via Network. For communication, task server 1 or 2 first sends a specified sequence of package data to a respective computer system (key server, Admin clients 1-3, or target server), with the sequence addressing one or multiple network ports of the addressed computer system.

If the verification is positive, the addressed computer system causes the transmission of a data package or of a file to be transmitted to the addressed computer system from the task server 1 or 2. This way, an addressed computer system fetches data packages or files for further processing from task servers 1 or 2. A transmission of this type may, for example, be effected by the Unix-based protocol "secure copy" (SCP). The decisive factor is that all network ports keep being closed at the addressed, encapsulated computer systems. By the port knocking process, some kind of "knocking" is effected to the encapsulated computer systems such that the latter can finally fetch the data packages destined for them from task servers 1 or 2.

FIG. 1A schematically shows basic method steps for a routing method of forwarding task instructions between admin client 1 and the target server by the computer network infrastructure.

In a step 1, the operator of the admin client 1 performs a specific task to be performed on the target server. The task may, for example, be processing of data to be transmitted, restarting of a program, physical access to a rack in which the target server is located, recovery of backup files in the target server, restricted SSH access to the target server or a similar operation. To that end, the operator may determine specified information to perform the task on the target server in the admin client 1 and compile them in a request file. The request file is then signed with a key (passphrase) locally present in the admin client 1. The request file is transmitted from admin client 1 to the task server 1. Subsequently, task server 1 performs a port knocking process with respect to the key server, as described above.

In 2, the key server fetches the request file from task server 1 and compares the information contained therein with specified basic functionalities of a possible task on the target server. Specified basic functionalities may, for example, be predefined and stored as form data in the key server by a security authorized person, for example. Furthermore, performance parameters to perform a task instructed by admin client 1 can be set in the target server. Performance parameters of this type may relate to performance time, performance period, identification data of specific entities, (security personnel, for example) or the like.

The key server generates a task description from the transmitted information and a selected basic functionality for the respective task and packs the description into a task file together with specified routing information.

The routing information is stored in the key server, (for example, by a security authorized person as well) and defines at least a specified communication path between the key server and the target server. This way, the routing information defines a fixed frame as to which transmission path the task file has to go and which involved computer system has to perform a specified action at what time to confirm, process and supplement and finally transport the generated task file to the target server for performing the task defined in this way. Advantageously, the identity of the above mentioned provisions can be verified on the key server, the target server, or as well in any intermediate step using a signature, by the mentioned security authorized person, for example. As the private keys to generate such a signature are not available at all in the network concerned here, manipulations of the provisions (such as the routing information) by an intruder are largely excluded.

Therefore, the task file has to follow a communication path fixedly specified in the key server such that a respective task is enabled to be successfully performed on the target server. Such a set routing increases security against external manipulations, since a deviation from the specified communication path or from the specified action in a certain computer system is detected and does not lead to a successful performance of a task in the target server.

The task file established in the key server, which includes the task description as well as the routing information, is transmitted from the key server to task server 1 and transmitted from there to admin client 2 using a port knocking process. The admin client 2 fetches the task file from task server 1 after the port knocking process. In the admin client 2, performance of a predefined local action is effected in step 3.

Such an action may, for example, include the insertion of further data into the task file and/or signing the task file with at least one private key of admin client 2 and/or encrypting the task file with a public key of the target server. It is further possible that an identification of the task file is generated or supplemented by an already existing identification. This serves for traceability in the communication path. By the identification, the task file may be monitored by a monitoring process (not shown in detail), for example.

After processing of the task file in the admin client 2, the task file is transferred back to the task server 1 and from there to the task server 2 in an exemplary manner. The server then performs a port knocking process with respect to admin client 3 so that admin client 3, which logically followed using the routing information in the communication path, fetches the task file processed by admin client 2 from task server 2 and again performs a new local action using the task file. This action may as well include a processing in the above-described frame. As an alternative to the illustrated network structure, it is as well possible to directly transmit the task file from the task server 1 to the admin client 3.

After performing the further action in the admin client 3, the task file is transmitted back to the task server 2. Then, the task server 2 performs a port-knocking process with respect to the target server, wherein the target server finally fetches the task file from the task server 2. In a final step 5, the target server verifies the task file and, if successful, locally performs a task defined in the task file.

The described computer network infrastructure as well as the routing method of forwarding the task instructions according to the manner illustrated thus form a safe middleware structure between admin client 1 as instruction giver and the target server as instruction taker. The further computer systems (key server, task server 1, 2 as well as the further admin clients 2 and 3) form a decentralized topology of the middleware structure for forwarding, supplementing and/or signing data packages to the target server.

Cumulative processing of a task file established by the key server by a plurality of admin clients increases security against external manipulations of the task file per se or of participating computer systems by external attackers. Because an attacker would have to obtain access to all involved systems and locally phish signatures or passphrases of users within these systems to finally manipulate a cumulative signature of the task file along the predefined communication path. However, the computer network infrastructure according to FIG. 1A and the basic routing method provide the advantage that a decentralized topology is provided, which allows event control of the target structure despite encapsulated individual systems (key server and admin clients 1 to 3 and target server). The decisive factor lies with the interplay between specified routing of a task file with the fact that security-relevant actions are performed locally on encapsulated systems, the systems not having open network ports for external addressability and thus vulnerability for attacks via a network.

Figure 1B:
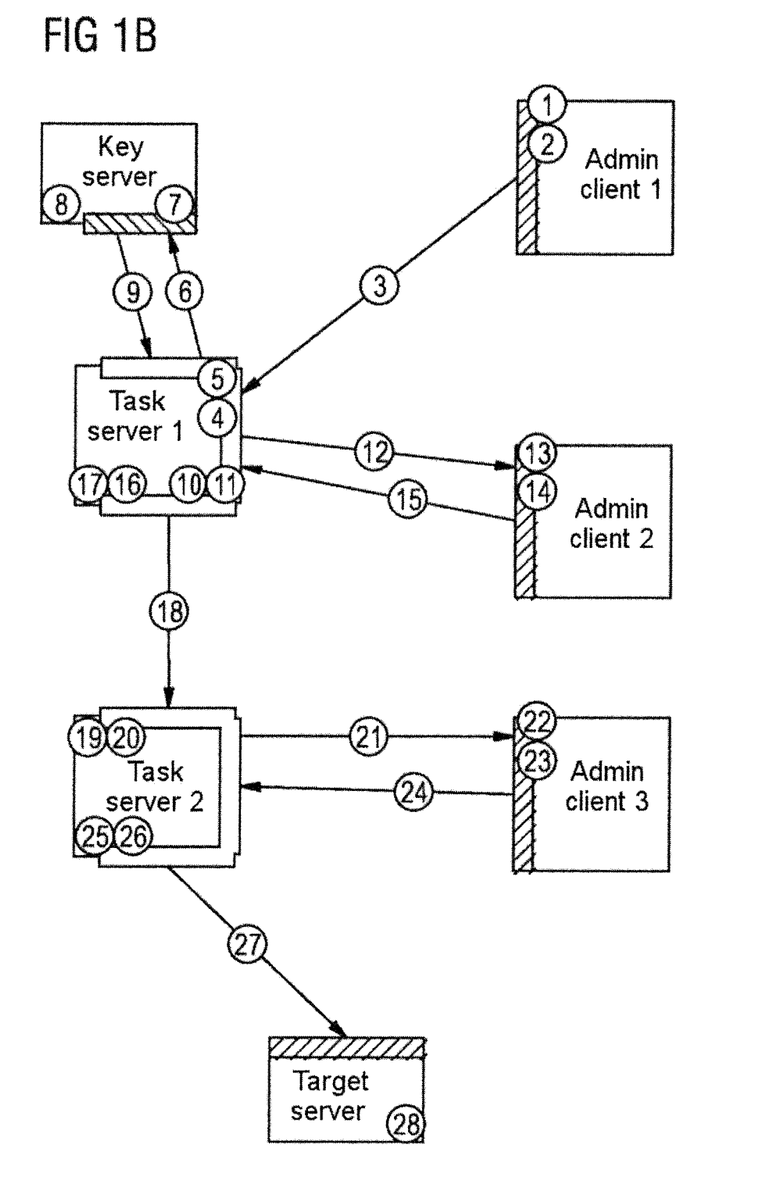
FIG. 1B shows the schematic illustration according to FIG. 1A with detailed method steps for communication.

FIG. 1B shows the computer network infrastructure according to FIG. 1A with detailed method steps. The steps are to be briefly illustrated again in the following.

The admin client 1 initiates a task to be performed on the target server in step 1. In step 2, the admin client 1 calls routing information to the key server and transports a request file to the task server 1 in step 3. The task server 1 receives the request file in step 4 and determines a routing to the key server in step 5. A port knocking of the task server 1 to the key server as well as a fetching of the task file from the task server by the key server is effected in step 6.

In step 7, the key server locally generates a task file and determines routing back to the task server 1 in step 8. In step 9, the established task file is transferred from the key server back to the task server 1. In step 10, the task server 1 receives the task file and determines routing back to admin client 2 in step 11. In step 12, port-knocking is performed to the admin client 2 and the task file is fetched from the task server 1 by the admin client 2.

A local action is effected using the task file in the admin client 2 in step 13, wherein in step 14 a routing back to the task server 1 is determined and the processed task file is transmitted back to the task server 1 in step 15.

In step 16, task server 1 receives the processed task file and determines routing to the task server 2 in step 17.

In step 18, the task file is further transmitted to task server 2 and finally received by task server 2 and stored there in step 19. In step 20, the task server determines routing to the admin client 3 and performs port-knocking to the admin client 3 in step 21, wherein the client fetches the task file from task server 2.

In step 22, a further local action is effected in the admin client 3 by the task file, wherein in step 23 a routing back to the task server 2 is set and in step 24 the further processed file is transmitted back to the task server 2.

In step 25, the task server 2 receives the further processed file and determines a routing to the target server in step 26.

In step 27, port knocking to the target server is effected, wherein the target server fetches the further processed file from the task server 2 and finally verifies the task file in step 28 and, if necessary, performs a respective task.

Figure 2:
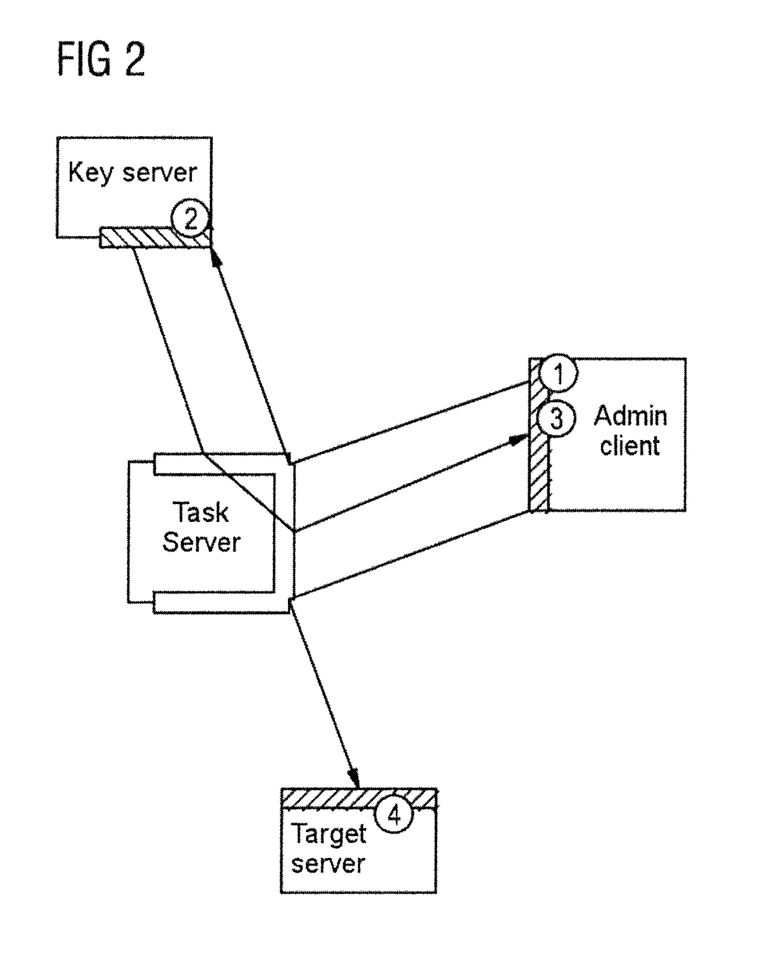
FIG. 2 shows a schematic illustration of a further example of a computer network infrastructure.

FIG. 2 shows a schematic illustration of a computer network infrastructure according to another example.

The computer network infrastructure merely comprises a key server, a task server, an admin client as well as a target server. In this configuration, the admin client serves for initiating a task by a request file in a first step 1, as well as for a further processing of the task file established in step 2 by the key server via an action to be executed locally in the admin client in step 3.

After executing the action, fetching the processed task file by the task server and a further transport to the target server is effected, wherein the respective task is executed there after verification of the task file. The continuing communication procedures correspond essentially to the procedures illustrated in FIGS. 1A and 1B and do not require further explanation here.

Figure 3:
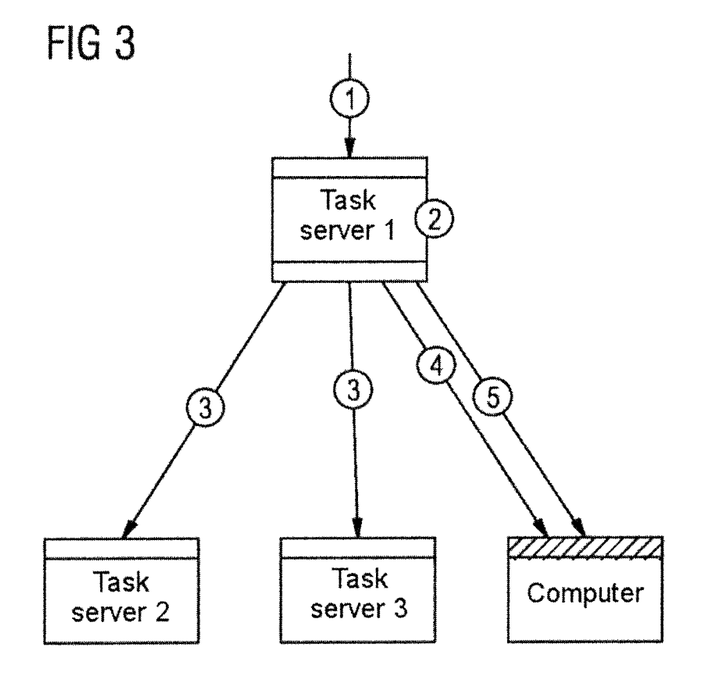
FIG. 3 shows a schematic illustration of a part of a computer network infrastructure for forwarding data to multiple recipients.

FIG. 3 shows part of a computer network infrastructure comprising a task server 1, a task server 2, a task server 3 and a computer. The computer is an encapsulated system with closed network ports (see cross-hatched input stage on the computer). The computer may be an admin client or a target server of the type described above or as well be a system constructed from these systems in a mixed manner.

Task server 1 is set up such that data packets can be further transmitted in parallel or sequentially via multiple parallel sub-paths of a communication path structure to multiple sequential computer systems (task server 2 and task server 3 as well as computer). Thus, task server 1 performs a so called 1:n distribution of data packets.

In a first step, a data packet reaches task server 1. In a step 2, the task server 1 determines a list of recipients to receive the data packages by predefined routing information. According to the configuration of FIG. 3, the recipients are task server 2, task server 3 and the computer. In a step 3, the data package is replicated and forwarded directly to task server 2 and task server 3.

Forwards the computer which (as described above) comprises closed network ports, first a port-knocking is effected in step 4, wherein the computer finally fetches the data package from task server 1 in step 5.

This way, a 1:n further distribution of data packets is finally enabled. It is as well possible to perform a cascade distribution, wherein one recipient of a plurality of recipients in turn forwards a data package to a plurality of further recipients.

It is possible to provide a data packet with a unique identification and/or to supplement an already allocated identification with a unique extension (see above). Task server 1 could supplement an identification of the received data packet with an extension which allows a traceability to which further recipients the data packet is to be sent or which recipient has actually received the data packet, respectively. In a further cascaded distribution, a chain of supplemented information could result so that traceability is possible throughout the entire network. It can be seen from which instance a respective data package is sent to which instance. An extension of an identification of a data package could include a "Max Counter" counter, comprising the number or a numeration of the systems to be reached. According to FIG. 3, the counter "Max Counter" could be provided with extension "3," since three computer systems follow task server 1 as the recipients. Furthermore, the counter "Max Counter" could provide any unique package with an extension clearly marking a respective target. The counter "Max Counter" could include extension "1" for task server 2 and extension "2" for task server 3 and include extension "3" for the computer.

The unique identification of a data packet can be monitored by a monitoring system and be understood and logged.

The examples of possible topologies of a computer network infrastructure are merely exemplary. Merely essentially involved components are illustrated for simplification purposes.

The invention claimed is:

1. A routing method of forwarding task instructions between secured computer systems in a computer network infrastructure, comprising:
   transmitting a request file from one of a group of one or multiple processing computer systems to one of a group of one or multiple broker computer systems, wherein the request file contains specified information to perform at least one task on a target computer system;
   transmitting the request file from the broker computer system to a key computer system, wherein the key computer system establishes a connection to the broker computer system to fetch the request file from the broker computer system;
   calling up routing information stored in the key computer system, wherein the routing information defines at least a routing to one or multiple computer systems to be compulsory involved along a communication path between the key computer system, the group of one or multiple broker computer systems and the target computer system within the computer network infrastructure;
   compiling a task description by the key computer system, wherein based upon the specified information of the request file a specified basic functionality of the task is selected by the key computer system;
   generating a task file in the key computer system, wherein the task file comprises at least the routing information and the task description of the task for the target computer system;
   transmitting the task file based upon the routing information along the communication path from the key computer system by the group of the broker computer systems to the target computer system;
   verifying validity of the task file by the target computer system;
   executing at least one task in the target computer system by the task file in the case that verification of validity of the task file was successful, wherein both the key computer system and the target computer system keep specified network ports used for the method closed such that externally establishing a connection to the key computer system or to the target computer system is not permitted and thus access via a network by said network ports is prevented, and
   the key computer system and the target computer system each establish a connection to a broker computer system to store the task file in the broker computer system or fetch it from there.

2. The method according to claim 1, wherein the specified information of the request file comprises at least:
   at least one of the group of the processing computer systems as instruction giver, and/or
   the target computer system as instruction taker, and/or
   a digital signature, and/or
   an instruction for performing a task, and/or
   confidential data.

3. The method according to claim 1, wherein each one of the group of the processing computer systems keeps specified network ports used for said method closed such that externally establishing a connection to the respective processing computer system is not permitted and thus access via a network by said network ports is prevented, and
   each one of the group of the processing computer systems establishes a connection to a broker computer system to store the task file or the request file in the broker computer system or fetch it from there.

4. The method according to claim 1, wherein the routing information define at least one of the group of the processing computer systems within the computer network infrastructure as computer system to be compulsory involved and the method further comprises:
   transmitting the task file from at least one of the group of the broker computer systems to at least one of the group of processing computer systems;
   performing at least one action in the processing computer system; and
   transmitting the task file from the processing computer system back to the broker computer system.

5. The method according to claim 4, wherein the at least one action comprises:
   inserting further data into the task file, and/or
   signing the task file with at least one private key, and/or
   encrypting the task file with a public key of the target computer system.

6. The method according to claim 5, wherein the method is recursively performed in several cycles between the group of the broker computer systems and the group of the processing computer systems and the task file is designed as a recursively set-up archive file containing at least:
   one or multiple work files,
   an inner archive file, and
   a signature of a processing computer system or of the key computer system from a preceding cycle, wherein the following sub-steps are performed in each cycle in a respective processing computer system:
   unpacking the task file set-up as an archive file,
   processing the one or multiple unpacked work files,
   packing at least the inner archive file and the signature of the preceding cycle in a second inner archive file,
   generating a new signature of the processing computer system involved in this cycle, and
   packing the second inner archive file, the processed one or multiple work files and the generated new signature into a new task file set-up as an archive file.

7. The method according to claim 4, wherein
   multiple security entities are set-up within the processing computer system,
   at least the receipt of the task file from the broker computer system, performing at least one action by the task file as well as transmission of the task file from the processing computer system back to the broker computer system is performed in separate processes by different security entities,
   a security entity of a process cannot establish a connection to a security entity of another process so that access to the security entity of the other process is prevented, and
   a subsequent process is triggered by an event mechanism so that a security entity of the subsequent process further processes the task file or data of the task file.

8. The method according to claim 1, wherein the transmission of the task file from one of the group of the broker computer systems to the target computer system or to one of the group of the processing computer systems comprises:
   sending a specified sequence of package data from the broker computer system to the target computer system or the processing computer system, wherein the specified network ports of the target computer system or of the processing computer system are closed and wherein the sequence addresses one or multiple network ports of the target computer system or the processing computer system in a specified order;

verifying the sent sequence for conformance with a predefined sequence in the target computer system or in the processing computer system; and causing the transmission of the task file by the target computer system or the processing computer system if the verification of the sent sequence is positive, and the target computer system or the processing computer system, respectively, establishes a connection to the broker computer system and fetches the task file.

9. The method according to claim 1, wherein the communication path comprises a plurality of sub-paths and the task file is subsequently transmitted from a broker computer system along the plurality of sub-paths to a plurality of computer systems in the communication path.

10. The method according to claim 1, wherein the task file is provided with an identification unique within the computer network infrastructure in at least one computer system involved along the communication path or an existing identification of the task file is supplemented.

11. Computer network infrastructure comprising:
a key computer system;
a processing computer system;
a target computer system; and
a broker computer system,
wherein
the processing computer system sends a request file to the broker computer system for performing at least one task on the target computer system,
the key computer system fetches the request file from the broker computer system and compiles a task description, wherein based upon specified information of the request file a specified basic functionality of the task is selected by the key computer system for performing the task in the target computer system,
the key computer system generates a task file from predefined routing information stored in the key computer system for a routing to one or multiple computer systems which are to be compulsory involved and to transmit said task file subsequently by the broker computer system to the target computer system, the task file comprising at least the routing information and the task description,
the target computer system verifies validity of the task file transmitted by the broker computer system to the target computer system and to perform the task in the target computer system based upon the task file, and
the target computer system and the key computer system each keep specified network ports used for said method closed such that externally establishing a connection to the key computer system or to the target computer system is not permitted and thus access via a network by said network ports is prevented, but establishing a connection from the key computer system or the target computer system to a broker computer system is permitted to store the task file in the broker computer system or fetch it from there.

12. The computer network infrastructure according to claim 11,
wherein
the processing computer system keeps specified network ports used for the method closed such that externally establishing a connection to the processing computer system is not permitted and thus access via a network by said network ports is prevented, and establishing a connection from the processing computer system to the broker computer system is permitted to store the task file or the request file in the broker computer system or fetch it from there.

13. The computer network infrastructure according to claim 11, that performs a method comprising a routing method of forwarding task instructions between secured computer systems in a computer network infrastructure, comprising:

transmitting a request file from one of a group of one or multiple processing computer systems to one of a group of one or multiple broker computer systems, wherein the request file contains specified information to perform at least one task on a target computer system;

transmitting the request file from the broker computer system to a key computer system, wherein the key computer system establishes a connection to the broker computer system to fetch the request file from the broker computer system;

calling up routing information stored in the key computer system, wherein the routing information defines at least a routing to one or multiple computer systems to be compulsory involved along a communication path between the key computer system, the group of one or multiple broker computer systems and the target computer system within the computer network infrastructure;

compiling a task description by the key computer system, wherein based upon the specified information of the request file a specified basic functionality of the task is selected by the key computer system;

generating a task file in the key computer system, wherein the task file comprises at least the routing information and the task description of the task for the target computer system;

transmitting the task file based upon the routing information along the communication path from the key computer system by the group of the broker computer systems to the target computer system;

verifying validity of the task file by the target computer system;

executing at least one task in the target computer system by the task file in the case that verification of validity of the task file was successful, wherein both the key computer system and the target computer system keep specified network ports used for the method closed such that externally establishing a connection to the key computer system or to the target computer system is not permitted and thus access via a network by said network ports is prevented, and the key computer system and the target computer system each establish a connection to a broker computer system to store the task file in the broker computer system or fetch it from there.

14. A non-transitory computer readable medium storing computer-readable instructions to be executed within a respective hardware processor on one or multiple computer systems and which, when being executed within the respective hardware processor, performs a method of forwarding task instructions between secured computer systems in a computer network infrastructure, comprising:

transmitting a request file from one of a group of one or multiple processing computer systems to one of a group of one or multiple broker computer systems, wherein the request file contains specified information to perform at least one task on a target computer system;

transmitting the request file from the broker computer system to a key computer system, wherein the key computer system establishes a connection to the broker computer system to fetch the request file from the broker computer system;

calling up routing information stored in the key computer system, wherein the routing information defines at least a routing to one or multiple computer systems to be compulsory involved along a communication path between the key computer system, the group of one or multiple broker computer systems and the target computer system within the computer network infrastructure;

compiling a task description by the key computer system, wherein based upon the specified information of the request file a specified basic functionality of the task is selected by the key computer system;

generating a task file in the key computer system, wherein the task file comprises at least the routing information and the task description of the task for the target computer system;

transmitting the task file based upon the routing information along the communication path from the key computer system by the group of the broker computer systems to the target computer system;

verifying validity of the task file by the target computer system;

executing at least one task in the target computer system by the task file in the case that verification of validity of the task file was successful, wherein both the key computer system and the target computer system keep specified network ports used for the method closed such that externally establishing a connection to the key computer system or to the target computer system is not permitted and thus access via a network by said network ports is prevented, and the key computer system and the target computer system each establish a connection to a broker computer system to store the task file in the broker computer system or fetch it from there.

* * * * *